US012583236B2

(12) United States Patent
LeFevre et al.

(10) Patent No.: US 12,583,236 B2
(45) Date of Patent: Mar. 24, 2026

(54) INKJET PRINTER WITH IMAGE DRYER FOR IMPROVING INK IMAGE QUALITY IN AN AQUEOUS INKJET PRINTER

(71) Applicant: Xerox Corporation, Norwalk, CT (US)

(72) Inventors: Jason M. LeFevre, Penfield, NY (US); Seemit Praharaj, Webster, NY (US); Douglas K. Herrmann, Webster, NY (US); Jorge A Alvarez, Webster, NY (US); Anthony S. Condello, Webster, NY (US)

(73) Assignee: Xerox Corporation, Norwalk, CT (US)

(*) Notice: Subject to any disclaimer, the term of this patent is extended or adjusted under 35 U.S.C. 154(b) by 149 days.

(21) Appl. No.: 18/403,456

(22) Filed: Jan. 3, 2024

(65) Prior Publication Data

US 2025/0214353 A1 Jul. 3, 2025

(51) Int. Cl.

*B41J 11/00* (2006.01)
*B41J 11/42* (2006.01)

(52) U.S. Cl.

CPC ............ *B41J 11/002* (2013.01); *B41J 11/007* (2013.01); *B41J 11/42* (2013.01)

(58) Field of Classification Search

CPC ......... B41J 11/002; B41J 11/007; B41J 11/42; B41J 11/00216

See application file for complete search history.

(56) References Cited

U.S. PATENT DOCUMENTS 10,350,912 B1 * 7/2019 Herrmann ............... F26B 3/283
2019/0291467 A1 * 9/2019 LeFevre ................... B41J 3/543

* cited by examiner

*Primary Examiner* — Bradley W Thies
(74) *Attorney, Agent, or Firm* — Maginot Moore & Beck LLP

(57) ABSTRACT

An inkjet printer has an image dryer that moves printed media sheets vertically through the dryer from an entrance to the image dryer to an exit from the image dryer. The vertical configuration of the image dryer enables the inkjet printer to increase the dwell time of the printed sheets in the image dryer without increasing a footprint of the inkjet printer.

20 Claims, 4 Drawing Sheets

INKJET PRINTER WITH IMAGE DRYER FOR IMPROVING INK IMAGE QUALITY IN AN AQUEOUS INKJET PRINTER

TECHNICAL FIELD

This disclosure relates generally to devices that produce aqueous ink images on media, and more particularly, to the fixing of ink images on media in such devices.

BACKGROUND

Inkjet imaging devices, also known as inkjet printers, eject liquid ink from printheads to form images on an image receiving surface. The printheads include a plurality of inkjets that are arranged in an array. Each inkjet has a thermal or piezoelectric actuator that is coupled to a printhead controller. The printhead controller generates firing signals that correspond to digital data content corresponding to images. The actuators in the printheads respond to the firing signals by expanding into an ink chamber to eject ink drops onto an image receiving surface and form an ink image that corresponds to the digital image content used to generate the firing signals. The image receiving surface is usually a continuous web of media material or a series of media sheets.

Inkjet printers used for producing color images typically include multiple printhead assemblies. Each printhead assembly includes one or more printheads that usually eject a single color of ink. In a typical inkjet color printer, four printhead assemblies are positioned in a process direction with each printhead assembly ejecting a different color of ink. The four ink colors most frequently used are cyan, magenta, yellow, and black. The common nomenclature for such printers is CMYK color printers. Some CMYK printers have two printhead assemblies that print each color of ink. The printhead assemblies that print the same color of ink are offset from each other by one-half of the distance between adjacent inkjets in the cross-process direction to double the number of pixels per inch density of a line of the color of ink ejected by the printheads in the two assemblies. As used in this document, the term "process direction" means the direction of movement of the image receiving surface as it passes the printheads in the printer and the term "cross-process direction" means a direction that is perpendicular to the process direction in the plane of the image receiving surface.

Image quality in color inkjet printers depends upon on many factors such as ink chemistry, printhead technology, thermals in the vicinity of the ink drops, print process setpoints, airflows, and ink-to-media spreading and drying interactions. One issue that degrades image quality is the level of fixing of a printed ink image to the media on which the image is printed. As used in this document, the term "fixing" refers to a level of drying of an ink image on a media sheet that is sufficient to prevent ink offset. The fixing of an ink image on a media sheet is typically achieved by exposing the media sheet and the ink image to a relatively high temperature heat to evaporate water or solvent in the ink image. The time required to fix an ink image to a media sheet depends upon the amount of ink in the ink image and the temperature of the heat to which the media sheet and ink image are exposed. When the temperature of the heat or the time of exposure to the heat is insufficient to fix an ink image properly, then ink in the ink image offsets from the media sheet onto media path nip rollers and then this offset ink is deposited onto subsequent media sheets that engage the rollers. The transfer of the offset ink from the rollers to the ink images on the subsequent media sheets adversely impacts the image quality of the ink images on those sheets.

At current media speeds in the vicinity of 850 mm/second, the fixing of aqueous ink images on some media sheets requires drying at temperatures of about 120° C.±5° C. for at least two seconds and with some media sheets longer periods of time for heat exposure would be required. Currently known inkjet printer dryers are not long enough to provide high temperature exposure for this required minimum time. Adding additional dryers in series to increase the length of the dryer and the time that the media sheets are within the dryers is not feasible as these additional dryers add considerable expense to the price of the printers and substantially increase the footprint of the printer. Being able to fix ink images on a range of media types without having to increase the footprint of the dryer within the printer would be beneficial.

SUMMARY

A color inkjet printer is configured to move media sheets bearing aqueous ink images vertically through a dryer that is configured to expose the media sheets to adequate heat for a sufficient time to fix the ink images. The color inkjet printer includes at least one printhead; a media transport for moving a media sheet through a print zone opposite the at least one printhead in a process direction; and an image dryer that follows the at least one printhead in the process direction, the image dryer having a housing having a first opening configured to receive media sheets from a media conveyor and a second opening that is vertically displaced from the first opening at a position that is lower than the first opening; and a media conveyor within the housing that is configured to move the received media sheets within the housing from the first opening to the second opening.

An image dryer for an inkjet printer moves media sheets bearing aqueous ink images vertically through a dryer that is configured to expose the media sheets to adequate heat for a sufficient time to fix the ink images. The image dryer includes a housing having a first opening configured to receive media sheets from a media conveyor and a second opening that is vertically displaced from the first opening at a position that is lower than the first opening; and a media conveyor within the housing that is configured to move the received media sheets within the housing from the first opening to the second opening.

BRIEF DESCRIPTION OF THE DRAWINGS

The foregoing aspects and other features of a color inkjet printer and color inkjet printer operational method that move media sheets bearing aqueous ink images vertically through a dryer that is configured to expose the media sheets to adequate heat for a sufficient time to fix the ink images are explained in the following description, taken in connection with the accompanying drawings.

DETAILED DESCRIPTION

Figure 1:
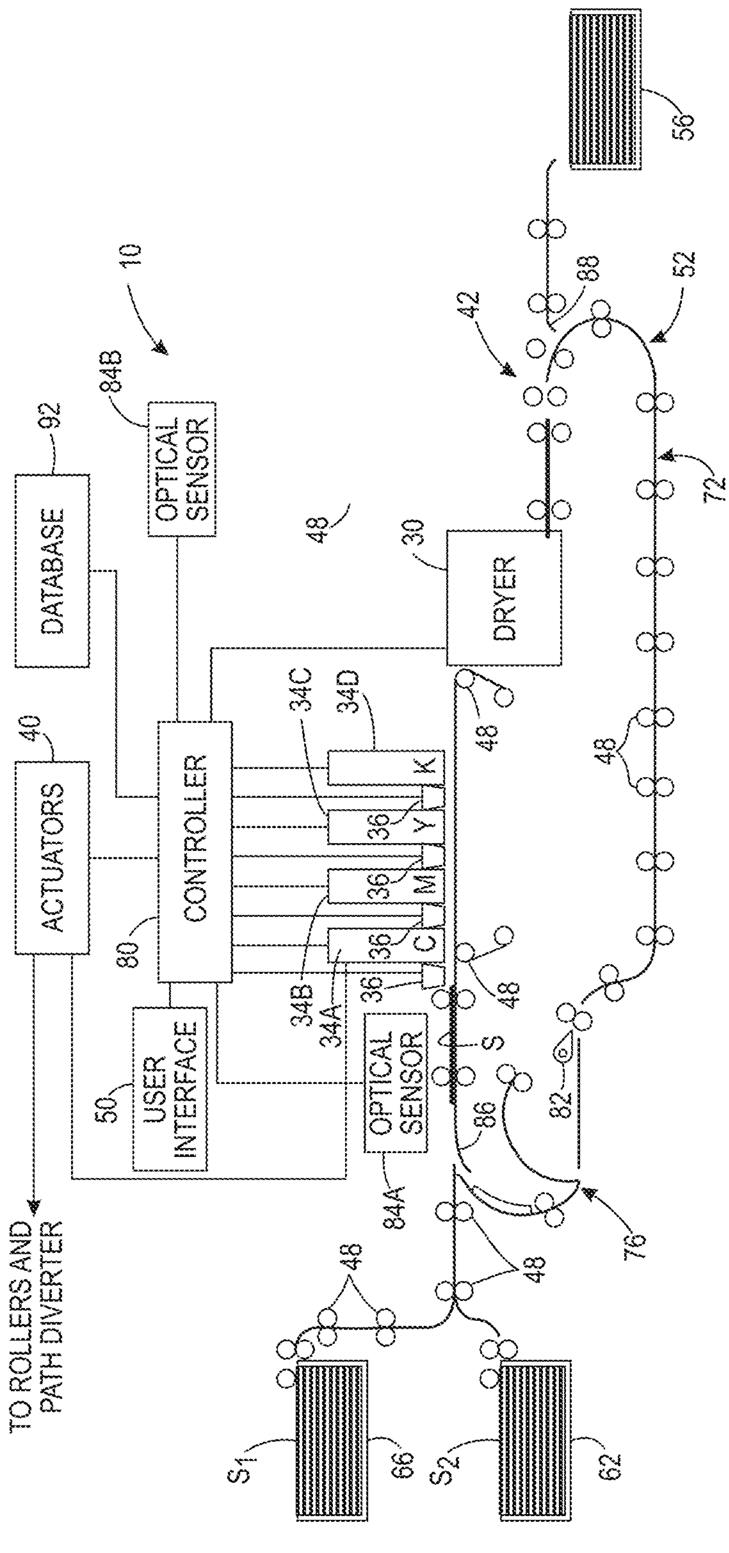
FIG. 1 is a schematic drawing of a color inkjet printer that is configured with a media sheet dryer that moves media sheets bearing aqueous ink images vertically through the dryer to expose the media sheets to adequate heat for a sufficient time to fix the ink images.

For a general understanding of the environment for the printer and the printer operational method disclosed herein as well as the details for the printer and the printer operational method, reference is made to the drawings. In the drawings, like reference numerals have been used throughout to designate like elements. As used herein, the word "printer" encompasses any apparatus that ejects ink drops onto media to form ink images.

The printer and method described below direct printed sheets into a dryer that moves the printed sheets vertically through the dryer and then places the at least partially dried sheets onto a media transport. The vertical structure of the dryer does not require the footprint of the inkjet printer to expand while increasing the dwell time of the printed sheets in the dryer.

FIG. 1 depicts a high-speed color inkjet printer 10 that is configured to dry fully or partially printed ink images on media sheets without expanding the footprint of previously known printers while increasing the dwell time of the printed sheets within the dryer. As illustrated, the printer 10 is a printer that directly forms an ink image on a surface of a media sheet stripped from one of the supplies of media sheets S1 or S2 and the sheets S are moved through the printer 10 by the controller 80 operating one or more of the actuators 40 that are operatively connected to pulleys or to at least one driving pulley of conveyor 52 that comprises a portion of the media transport 42 that passes through the print zone PZ of the printer. As used in this document, the term "partial ink image" or "partially printed image" means an ink image on a media sheet that contains less than all of the color separations needed to print an ink image that corresponds to all of the ink image content data for an image. As used in this document, the term "print zone" means the portion of the media transport that is opposite any of the printhead assemblies in the printer.

The printer 10 is configured to perform print jobs sent to the printer by an external data source. As used in this document, the term "print job" means ink image content data for a series of ink images to be produced by a printer and the print job parameters at which the printer is operated to produce the ink images. The ink image content data is sent to the controller 80 from either an external data source, such as a scanning system or an online or work station connection. The ink image content data is processed to generate the inkjet ejector firing signals delivered to the printheads in the modules 34A-34D. Along with the ink image content data, the controller also receives print job parameters that identify the media weight, media dimensions, print speed, media type, ink area coverage to be produced on each side of each sheet, location of the image to be produced on each side of each sheet, media color, media fiber orientation for fibrous media, print zone temperature and humidity, media moisture content, media manufacturer, and the like for executing a print job. As used in this document, the term "print job parameters" means non-image content data for performing a print job and the term "ink image content data" means digital data that identifies a color and a volume of each ejected ink drop that forms pixels in the ink images to be printed on the media sheets produced by a print job.

In one embodiment, each printhead module of the printer 10 has only one printhead that has a width that corresponds to a width of the widest media in the cross-process direction that can be printed by the printer. In other embodiments, the printhead modules have a plurality of printheads with each printhead having a width that is less than a width of the widest media in the cross-process direction that the printer can print. In these modules, the printheads are arranged in an array of staggered printheads that enables media wider than a single printhead to be printed. Additionally, the printheads within a module or between modules can also be interlaced so the density of the drops ejected by the printheads in the cross-process direction can be greater than the smallest spacing between the inkjets in a printhead in the cross-process direction. Although printer 10 is depicted with only two supplies of media sheets, the printer can be configured with three or more sheet supplies, each containing a different type or size of media.

The media transport 42 includes a belt for moving print media, such as paper sheets, envelopes, or any other article suitable for receiving printed images, through the print zone so the printheads can eject ink drops onto the moving media to form printed images on the media. The belt has holes in it and the belt moves over a vacuum plenum within the conveyor 52 so a suction force can be generated through the surface of the belt. Each print medium engages a portion of the holes on the surface of the belt and the suction force holds the print medium to the surface of the belt to prevent the print media from slipping or otherwise moving relative to the surface of the belt as the belt moves through the printer. Holding each print medium in place relative to the surface of the moving belt enables the printer to control the timing of the operation of printheads to ensure that the printheads form printed images in proper locations on each print medium and ensures that the print media do not cause jams or other mechanical issues with the printer. In large-scale printer configurations, the belt often carries multiple print media simultaneously.

With continued reference to FIG. 1, a fully or partially printed media sheet enters into an image dryer 30 after the ink image is printed on a sheet S. As described in more detail below, the sheet lands on a shelf that moves vertically within the dryer, and then exits the dryer at the lower end of the dryer. The image dryer 30 can include an infrared heater, a heated air blower, air returns, or combinations of these components to heat the ink image and at least partially fix an image to the sheet. An infrared heater applies infrared heat to the printed image on the surface of the web to evaporate water or solvent in the ink. The heated air blower directs heated air using a fan or other pressurized source of air over the ink to supplement the evaporation of the water or solvent from the ink. Additionally, the shelves that support the media sheets in the dryer can be heated to aid in the fixing of the ink images to the media sheets. The moist air is collected and evacuated by air returns to reduce the interference of the dryer air flow with other components in the printer.

A return path 72 is provided to receive a sheet from the media transport 42 after a substrate has been completely or partially printed and passed through the dryer 30. The sheet is moved by the rotation of pulleys in a direction opposite to the direction of movement in the process direction past the printheads. An actuator 40 operatively connected to pivot 88 is operated by the controller 80 to either block entry to the return path 72 and direct the media to the receptacle 56 or direct the media to the return path 72. At position 76, the substrates on the return path 72 can either be turned over so they can merge into the job stream being carried by the media transport 42 and the opposite side of the media sheet can be printed or left as they are so the printed side of the sheet can be printed again. To leave the sheets as they are, the controller 80 operates an actuator to turn pivot 82 counterclockwise from the position shown in the figure so the sheets bypass the bend in the return path and are directed to position 76 without being turned over. Thus, the printed side of the sheet can be printed. If the controller 80 operates the actuator to turn pivot 82 clockwise to the position in the figure, then the sheet is directed to the bend and is flipped before being returned to the transport path 42.

The printer 10 is configured with two optical sensors 84A and 84B. The optical sensor 84A that precedes the print zone in the process direction is used to generate image data of partially printed ink images returned to the media transport 42 for a second pass of the media sheet through the print zone for completion of the ink image. The optical sensor 84B that follows the dryer 30 in the process direction is used to generate image data of completely printed and partially printed ink images that have passed through the dryer. The controller is configured to process the image data from optical sensor 84B to determine whether the operation of the heater components in the dryer 30 need adjustment. The optical sensors 84A and 84B can be a digital camera, an array of LEDs and photodetectors, or other devices configured to generate image data of a passing surface.

As further shown in FIG. 1, the printed media sheets S not diverted to the return path 72 are carried by the media transport to the sheet receptacle 56 in which they are be collected. While FIG. 1 shows the printed sheets as being collected in the sheet receptacle, they can be directed to other processing stations (not shown) that perform tasks such as folding, collating, binding, and stapling of the media sheets.

Operation and control of the various subsystems, components and functions of the machine or printer 10 are performed with the aid of a controller or electronic subsystem (ESS) 80. The ESS or controller 80 is operatively connected to the components of the printhead modules 34A-34D (and thus the printheads), the actuators 40, the dryer 30, and the optical sensors 84A and 84B. The ESS or controller 80, for example, is a self-contained computer having a central processor unit (CPU) with electronic data storage, and a display or user interface (UI) 50. The ESS or controller 80, for example, includes a sensor input and control circuit as well as a pixel placement and control circuit. In addition, the CPU reads, captures, prepares, and manages the image content data flow between image input sources, such as a scanning system or an online or a work station connection (not shown), and the printhead modules 34A-34D. As such, the ESS or controller 80 is the main multi-tasking processor for operating and controlling all of the other machine subsystems and functions, including the printing process.

The controller 80 can be implemented with general or specialized programmable processors that execute programmed instructions. The instructions and data required to perform the programmed functions can be stored in non-transitory, computer-readable memory associated with the processors or controllers. The processors, their memories, the instructions and data stored in the memories, and the interface circuitry configure the controllers to perform the operations described below. These components can be provided on a printed circuit card or provided as a circuit in an application specific integrated circuit (ASIC). Each of the circuits can be implemented with a separate processor or multiple circuits can be implemented on the same processor. Alternatively, the circuits can be implemented with discrete components or circuits provided in very large scale integrated (VLSI) circuits. Also, the circuits described herein can be implemented with a combination of processors, ASICs, discrete components, or VLSI circuits.

In operation, ink image content data for an ink image to be produced is sent to the controller 80 from either a scanning system or an online or work station connection. The ink image content data is processed to generate the inkjet ejector firing signals delivered to the printheads in the modules 34A-34D. Along with the ink image content data, the controller receives print job parameters that identify the media weight, media dimensions, print speed, media type, ink area coverage to be produced on each side of each sheet, location of the image to be produced on each side of each sheet, media color, media fiber orientation for fibrous media, print zone temperature and humidity, media moisture content, and media manufacturer.

Figure 2:
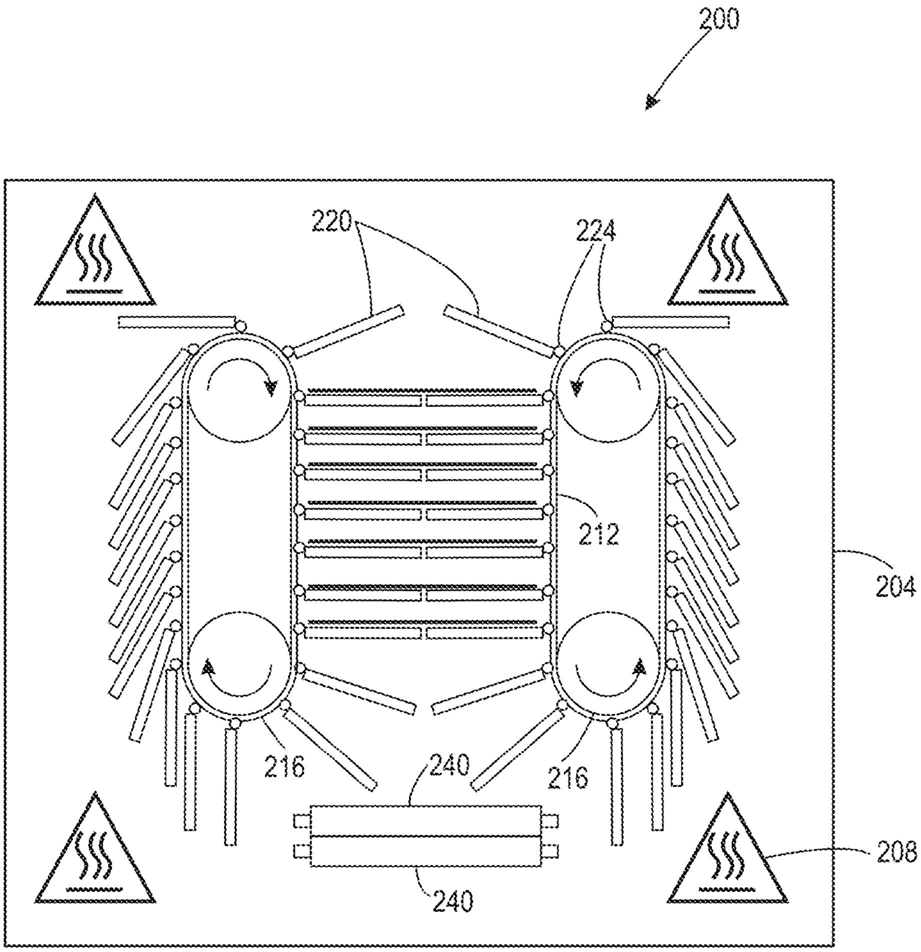
FIG. 2 is a front perspective drawing of a printed media conveyor within dryer 30 of the printer 10 shown in FIG. 1.
Figure 3:
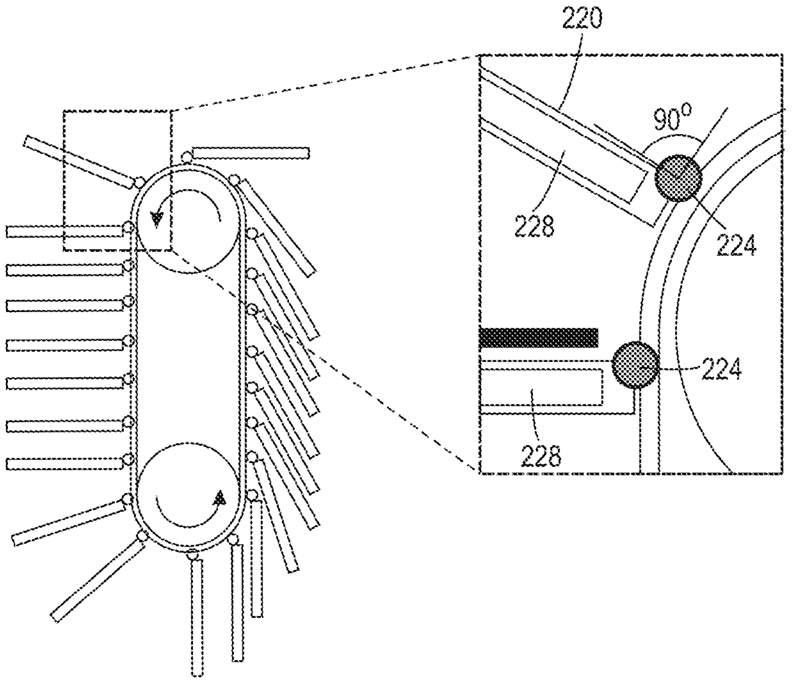
FIG. 3 depicts the operation of a pivoting member at different positions on one of the belts shown in FIG. 2.

One embodiment 200 of the dryer 30 (FIG. 1) is shown in FIG. 2. The dryer 200 has a housing 204 and heaters 208 mounted within the housing that heat the space within the housing 204. Each endless belt 212 in a pair of endless belts 212 are mounted about a pair of pulleys 216 so a first end or loop portion of the belt engages a pulley and a second end or loop portion of the belt engages a second pulley. Each belt 212 has a plurality of shelf segments 220 that are mounted to the side of the belts opposite the side that contacts the pulleys with a plurality of pivot members 224 in a one-to-one correspondence. As used in this document, the term “shelf segment” means a planar member that is coupled at a first end to an endless belt and has a second end that is unattached to an endless belt within a dryer housing. The shelf segments 220 have a same length and width so the ends of the shelf segments on the two belts 212 abut one another when the shelf segments are following the belts in their downward paths. The pulleys 216 are operatively connected to actuators 40 (FIG. 1) that are operated by the controller 80 (FIG. 1). All or a subset of the pulleys 216 are operatively connected to the actuators 40 so the pulleys are rotated about their center axes. In embodiments where only some of the pulleys are connected to actuators, the remaining pulleys are rotated about their center axes by the tension of the belts as they rotate over the driven pulleys 216. The inset in FIG. 3 shows the pivot members 224 in more detail. These pivot members 224 are configured to limit the range of the movement of the shelf segment 220 to which the pivot member is attached to ninety degrees.

The configuration of the pivot members 224 and gravity cause the shelf segments 220 to cooperate and form shelves for supporting printed media sheets. This operation is now described with reference to FIG. 2. The pulleys 216 for the leftmost belt 212 rotate in the clockwise direction while the pulleys 216 for the rightmost belt 212 rotate in the counterclockwise direction. At the lowest point of the circumference of the two lower pulleys 212, the pivot members 224 and gravity cause the shelf segments 220 to extend perpendicularly from the belts. As the belts ascend in their respective directions of rotation, the shelf segments 220 begin to rotate with respect to the belts at acute angles. At the top of the ascent, the shelf segments 220 are at a horizontal tangent to the highest point of the circumferences of the two upper pulleys. As these shelf segments 220 continue to rotate as they begin to descend within the housing, the shelf segments fall under the effect of gravity but their rotation is limited to ninety degrees by the pivot members so the shelf segments extend horizontally from the belts and the ends of the shelf segments abut one another to form a shelf for supporting printed media sheets. The printed sheets enter the housing 204 of the dryer 200 through an entrance in the housing so the sheets move through the plane of the figure from behind the figure. Once on the cooperating shelf segments that form a shelf, the sheets remain stationary until they reach the bottom of the descent through the housing. As the shelf segments begin to separate, the sheets drop through the opening between the shelf segments onto the floor of the housing. The controller operates an actuator to move a tab toward the trailing edge of the sheet to urge the leading edge into a nip between two rollers 240 being rotated by a pair of actuators. The rotating rollers move the sheet through an exit in the housing so the sheets move out of the plane of the figure toward the viewer. The controller 80 operates the actuators 40 driving the pulleys for rotation of the belts so their movements are synchronized and the shelf segments cooperate with one another to form the shelves for the vertical movement of the media sheets within the dryer.

In the embodiment of FIG. 2, the shelf segments 220 are made of a thermally conductive material, such as aluminum, and are heated using a resistive heater to supplement the heat provided by the heaters 208. Electrical power is delivered to the heaters within the using a "slip ring" type of device. These slip ring electrical power connectors can deliver electrical power to the resistive heaters in the shelf segments throughout the entire cycle of movement of the rotating belts. These slip ring connectors are commercially available and are used in electromechanical devices, such as wind turbines, rotating automation equipment, and the like, to supply electrical power to moving components.

Figure 4:
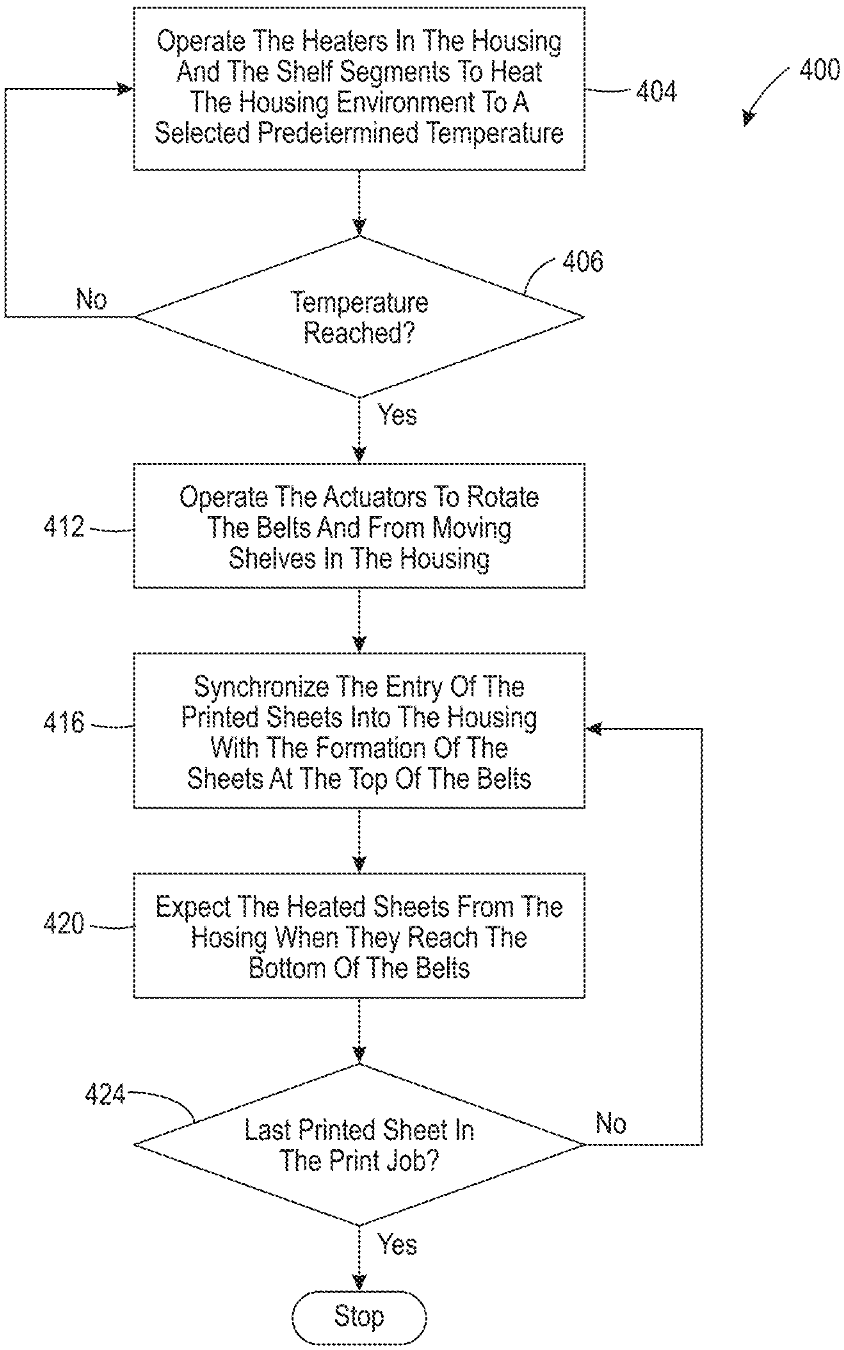
FIG. 4 is a flow diagram of a process for operating the printer of FIG. 1 to synchronize the movement of the media sheets through the dryer.

FIG. 4 is a flow diagram for a process 400 that extends the drying time for media sheets in a dryer by vertically passing the sheets through the dryer. In the discussion below, a reference to the process 400 performing a function or action refers to the operation of a controller, such as controller 80, to execute stored programmed instructions to perform the function or action by operating other components in the printer. The process 400 is described as being performed with the printer 10 of FIG. 1 for illustrative purposes.

Prior to process 400 operating the printer 10, the controller operates the heaters within the housing and the resistive heaters in the shelf segments until a predetermined temperature is reached (block 404). In one embodiment, the predetermined temperature is in a range of about 50° C. to about 100° C. with an accuracy of 5° C. The predetermined temperature is selected with reference to the type and size of the media and the average amount of ink on the sheets printed during a print job. A temperature sensor within the housing is configured to generate a signal indicative of the ambient air temperature within the housing. Once the controller determines the selected temperature has been reached (block 408), the process 200 operates the actuators 40 to rotate the two belts in the housing about the pulleys (block 412). As sheets are printed, they are directed into the housing entrance in synchronization with the formation of the shelves with the shelf segments at the top of the belts (block 416). Once the sheets descend to the bottom of the belts, they are ejected through the housing exit using a known sheet ejector onto the media transport and then either delivered to the receptacle or to the return path for additional printing (block 420). The process stops when the last sheet in a print job is printed (block 424).

It will be appreciated that variants of the above-disclosed and other features, and functions, or alternatives thereof, may be desirably combined into many other different systems or applications. Various presently unforeseen or unanticipated alternatives, modifications, variations, or improvements therein may be subsequently made by those skilled in the art, which are also intended to be encompassed by the following claims.

What is claimed is:

1. An image dryer for an inkjet printer comprising:
- a housing having a first opening configured to receive media sheets from a media conveyor and a second opening that is vertically displaced from the first opening at a position that is lower than the first opening; and
- a media conveyor within the housing that is configured to move the received media sheets within the housing from the first opening to the second opening, the media conveyor including at least one endless belt and a plurality of shelf segments configured to move along a path defined by the at least one endless belt, each shelf segment having a first end coupled to the at least one endless belt and a second end that is unattached to the at least one endless belt so the second end of each shelf segment can rotate about the first end of each shelf segment by a predetermined number of degrees.

2. The image dryer of claim 1, the media conveyor further comprising:
- a first endless belt having a first end and a second end;
- a second endless belt having a first end and a second end, the first and second endless belts being positioned parallel to one another and oriented so the first ends of the first and second endless belts area are higher than the second ends of the first and second endless belts;
- a first plurality of pulleys about which the first endless belt rotates;
- a second plurality of pulleys about which the second endless belt rotates;
- a first plurality of shelf segments, each shelf segment in the first plurality of shelf segments having a first end coupled to the first endless belt and a second end that is unattached to either the first endless belt or the second endless belt so the second end of each shelf segment can rotate about the first end of each shelf segment by a predetermined number of degrees; and
- a second plurality of shelf segments, each shelf segment in the second plurality of shelf segments having a first end coupled to the second endless belt and a second end that is unattached to either the first endless belt or the second endless belt so the second end of each shelf segment can rotate about the first end of each shelf segment by a predetermined number of degrees.

3. The image dryer of claim 2 wherein the first plurality of pulleys rotate in a direction that is opposite a direction of rotation of the second plurality of pulleys.

4. The image dryer of claim 3 wherein each shelf segment in the first plurality of shelf segments and in the second plurality of shelf segments has a same length.

5. The image dryer of claim 4 wherein each shelf segment in the first plurality of shelf segments and in the second plurality of shelf segments has a same width.

6. The image dryer of claim 5 wherein a number of shelf segments in the first plurality of shelf segments is equal to a number of shelf segments in the second plurality of shelf segments.

7. The image dryer of claim 6 wherein the first ends of each shelf segment in the first plurality of shelf segments and the first ends of each shelf segment in the second plurality of shelf segments are coupled to the first endless belt and the second endless belt, respectively, with a pivoting member.

8. The image dryer of claim 7 wherein each pivoting member limits rotation of the second end of each shelf segment about the first end of each shelf segment by no more than ninety degrees.

9. The image dryer of claim 8 further comprising:

a plurality of actuators, at least one actuator in the plurality of actuators being operatively connected to at least one pulley in the first plurality of pulleys and at least one actuator in the plurality of actuators being operatively connected to at least one pulley in the second plurality of pulleys; and a controller operatively connected to the actuators, the controller being configured to:

operate the at least one actuator in the plurality of actuators operatively connected to the at least one pulley in the first plurality of pulleys and the at least one actuator in the plurality of actuators operatively connected to the at least one pulley in the second plurality of pulleys to rotate the first endless belt about the first plurality of pulleys and to rotate the second endless belt about the second plurality of pulleys.

10. The image dryer of claim 9, the controller being further configured to:

synchronize the rotation of the first endless belt about the first plurality of pulleys with the rotation of the second endless belt about the second plurality of pulleys so the second ends of at least some of the shelf segments in the first plurality of shelf segments rotate about the pivoting members coupling the at least some of the shelf segments to the first endless belt and abut the second ends of at least some of the shelf segments in the second plurality of shelf segments to form shelves for supporting sheets as the shelves move downwardly through the image dryer.

11. An inkjet printer comprising:

at least one printhead;

a media transport for moving a media sheet through a print zone opposite the at least one printhead in a process direction; and an image dryer that follows the at least one printhead in the process direction, the image dryer having:

a housing having a first opening configured to receive media sheets from a media conveyor and a second opening that is vertically displaced from the first opening at a position that is lower than the first opening; and a media conveyor within the housing that is configured to move the received media sheets within the housing from the first opening to the second opening, the media conveyor including a plurality of shelf segments configured to receive the media sheets along a path, each shelf segment having a first end and an opposite second end, wherein the second end of each shelf segment is configured to rotate about the first end by a predetermined number of degrees as the shelf segment moves along the path.

12. The inkjet printer of claim 11, the media conveyor in the image dryer further comprising:

a first endless belt having a first end and a second end;

a second endless belt having a first end and a second end, the first and second endless belts being positioned parallel to one another and oriented so the first ends of the first and second endless belts area are higher than the second ends of the first and second endless belts;

a first plurality of pulleys about which the first endless belt rotates;

a second plurality of pulleys about which the second endless belt rotates;

a first plurality of shelf segments, each shelf segment in the first plurality of shelf segments having a first end coupled to the first endless belt and a second end that is unattached to either the first endless belt or the second endless belt so the second end of each shelf segment can rotate about the first end of each shelf segment by a predetermined number of degrees; and a second plurality of shelf segments, each shelf segment in the second plurality of shelf segments having a first end coupled to the second endless belt and a second end that is unattached to either the first endless belt or the second endless belt so the second end of each shelf segment can rotate about the first end of each shelf segment by a predetermined number of degrees.

13. The inkjet printer of claim 12 wherein the first plurality of pulleys rotate in a direction that is opposite a direction of rotation of the second plurality of pulleys.

14. The inkjet printer of claim 13 wherein each shelf segment in the first plurality of shelf segments and in the second plurality of shelf segments has a same length.

15. The inkjet printer of claim 14 wherein each shelf segment in the first plurality of shelf segments and in the second plurality of shelf segments has a same width.

16. The inkjet printer of claim 15 wherein a number of shelf segments in the first plurality of shelf segments is equal to a number of shelf segments in the second plurality of shelf segments.

17. The inkjet printer of claim 16 wherein the first ends of each shelf segment in the first plurality of shelf segments and the first ends of each shelf segment in the second plurality of shelf segments are coupled to the first endless belt and the second endless belt, respectively, with a pivoting member.

18. The inkjet printer of claim 16 wherein each pivoting member limits rotation of the second end of each shelf segment about the first end of each shelf segment by no more than ninety degrees.

19. The inkjet printer of claim 18 further comprising:

a plurality of actuators, at least one actuator in the plurality of actuators being operatively connected to at least one pulley in the first plurality of pulleys and at least one actuator in the plurality of actuators being operatively connected to at least one pulley in the second plurality of pulleys; and a controller operatively connected to the actuators, the controller being configured to:

operate the at least one actuator in the plurality of actuators operatively connected to the at least one pulley in the first plurality of pulleys and the at least one actuator in the plurality of actuators operatively connected to the at least one pulley in the second plurality of pulleys to rotate the first endless belt about the first plurality of pulleys and to rotate the second endless belt about the second plurality of pulleys.

20. The inkjet printer of claim 19, the controller being further configured to:

synchronize the rotation of the first endless belt about the first plurality of pulleys with the rotation of the second endless belt about the second plurality of pulleys so the second ends of at least some of the shelf segments in the first plurality of shelf segments rotate about the pivoting members coupling the at least some of the shelf segments to the first endless belt and abut the second ends of at least some of the shelf segments in the second plurality of shelf segments to form shelves for supporting sheets as the shelves move downwardly through the image dryer.

* * * * *